United States Patent Office 2,880,190
Patented Mar. 31, 1959

2,880,190

PROCESS OF CURING BUTADIENE POLYMERS IN THE PRESENCE OF A HYDROCARBON DILUENT AND DI-TERTIARY BUTYL PEROXIDE

Anthony H. Gleason, Westfield, N.J., assignor to Esso Research and Engineering Company, a corporation of Delaware No Drawing. Application November 24, 1954
Serial No. 471,095

7 Claims. (Cl. 260—33.6)

This invention relates to the production of synthetic resinous materials which are completely insoluble, infusible, hard masses possessing good machineability, good dielectric properties, and low moisture permeability.

It has been shown in application Serial No. 334,356, filed January 30, 1953, now U.S. Patent 2,772,254, that polymers and copolymers of butadiene can be cured in the presence of ditertiary butyl peroxide at temperatures from 100 to 175° C. The products are characterized by having superior electrical properties and high ASTM distortion temperatures. A serious drawback in the use of such resins is that they are too permeable to moisture vapor for some purposes, being three to four times that for polyethylene and styrene-isobutylene copolymers.

It is the main object of the present invention to overcome these disadvantages of the above resins from butadiene and to provide a method for preparing such resins having low moisture permeability values suitable for electrical purposes.

These and other objects of this invention are accomplished by heating the polymers of butadiene or copolymers of butadiene and styrene at temperatures from 100 to 175° C. in the presence of 1.5 to 5% or more of ditertiary butyl peroxide and 5 to 20% of an inert, predominantly aliphatic or naphthenic hydrocarbon diluent boiling above 200° C., preferably between 300 and 600° C. Suitable oils include white mineral oils and paraffin wax.

The polymers to which the present invention are primarily applicable are those prepared by copolymerizing 100 to 50 parts of butadiene-1,3 and 0 to 50 parts of styrene with an alkali metal catalyst such as sodium. A particularly suitable polymer is an oily copolymer of 75 to 85% butadiene and 15 to 25% styrene. The polymerization is carried out in a reaction diluent at temperatures ranging from about 25 to 95° C., or preferably between 40 and 90° C., and is desirably continued until complete conversion of monomers is obtained. About 1.2 to 5 parts, preferably 1.5 to 4 parts, of finely divided metallic sodium per 100 parts of monomers are used as catalysts. Materials used as diluents in the polymerization are inert hydrocarbons which remain liquid under the reaction conditions employed. Accordingly, the diluents employed have a boiling point between about 10 and 200° C., the low boiling diluents being useful where it is feasible to keep the reaction pressure sufficiently high to maintain the diluent in liquid condition at the reaction temperature used.

Preferred diluents are essentially aliphatic hydrocarbons such as naphtha having a boiling range between about 90 and 120° C., or straight-run mineral spirits such as "Varsol" having a boiling range between about 150 and 200° C. Butane, benzene, cyclohexane, toluenes, pentanes and similar inert hydrocarbons are also useful, individually or in admixture with each other. The hydrocarbon diluents are used in amounts ranging from 100 to 500, preferably 150 to 300 parts per 100 parts of monomers. In other words, the resulting oily composition as synthesized normally contains about 20% to 50% of the polymer dissolved in a hydrocarbon solvent. When desired, more concentrated compositions can be produced from the synthesis product by stripping off excess solvent. For purposes of the present invention, it is desirable to concentrate non-volatile matter to at least 90 and preferably 100%. The presence of solvent is unnecessary and is undesirable except in small amounts.

Furthermore, to promote the original polymerization reaction and to assure the formation of a light colored product, it is also desirable to employ in the polymerization about 10 to 40 or more parts of an ether promoter per 100 parts of monomers. Cyclic diethers of 4 to 8 carbon atoms having an —O—C—C—O— group, such as dioxane-1,4 and its methyl and ethyl homologues, have been found as particularly effective promoters. Other suitable ether promoters are aliphatic mono- or di-ethers of 4 to 8 carbon atoms, such as diethyl ether, diethyl ether of ethylene glycol, and diethyl ether of diethylene glycol. Finally, it is also beneficial in many cases, although not essential, to use about 5 to 35 weight percent (based on sodium) of an alcohol such as methanol, isopropanol or n-amyl alcohol, especially where the sodium catalyst particles are relatively coarse.

The resulting product may vary from a low viscosity oil to a solid high molecular weight polymer and the invention is equally applicable to any such product of whatever intrinsic viscosity.

The present invention is based on the discovery that when products of the nature described above are cured in the presence of 5 to 20% of an inert, predominantly aliphatic or naphthenic hydrocarbon diluent boiling above 200° C., preferably between 300° and 600° C., at a temperature of 100–250° C., the moisture vapor permeability of the resin is lowered to a value suitable for the most exact electrical requirements. The curing may be carried out in the presence or absence of a catalyst such as 1.5 to 5% of t-butyl peroxide.

The advantages of using the catalytic method of curing are that it permits the use of relatively low temperatures and that it reduces the necessity of curing in an inert atmosphere and reduces the need for air-tight molds.

Castings may be made by the addition of the catalyst and curing for 3 to 5 days on a rising temperature schedule of 100–175° C. A typical schedule is as follows:

18 hours at 110° C.
24 hours at 125° C.
24 hours at 135° C.
1 or more days at 150° C.

The schedule may be lengthened somewhat depending on the hardness and distortion temperature desired in the resin, but a stepwise increase in curing temperature is desirable both as a means of controlling the rate of polymerization and to minimize mold adhesion. Too rapid curing can cause the castings to crack as a result of inadequate dissipation of the heat of reaction.

When no catalyst is used temperatures of 200–250° C. must be employed and the diluent must boil above 250° C., the maximum temperature of cure. A typical schedule is as follows:

24 hours at 210° C.
24 hours at 225° C.
1 or more days at 240–250° C.

Fillers such as mica, asbestos, silica, dicolite, etc. may be used to increase impact strength, improve the thermal conductivity, and shorten the curing time of these resins.

The resins obtained by the process of this invention have excellent dielectric properties. The dielectric constant is about 2.5 and the dielectric strength is about 800 volts per mil. They are not thermoplastic and must be cast or machined to the desired shape. The specific gravity is in the range of 0.99 to 1.01 depending on the cure. Distortion temperatures may range up to 150° C. and higher. Under no load the resin possesses considerable form stability at temperatures above the distortion point. At a medium cure the resin will have a Rockwell-M hardness of about 100. The impact strength is adequate for commercial usage. The resin machines fairly well if sharp tools are used, giving cuttings which are fine and powdery.

The following examples illustrate the benefits to be obtained by the process of this invention.

*Example I*

An oily copolymer of butadiene and styrene was prepared according to the following recipe:

|  | Parts by wt. |
|---|---|
| Butadiene | 80 |
| Styrene | 20 |
| Naphtha | 200 |
| Dioxane | 30 |
| Sodium | 1.5 |
| Isopropanol | 0.3 |
| Temperature, 50° C. | |

Complete conversion was obtained in eight hours. The catalyst was destroyed and removed from the resulting crude product. The product was finished to contain 100% non-volatile matter as described above.

*Example II*

The product of Example I, having an intrinsic viscosity of 0.2, was mixed with 3% and 4% by weight of ditertiary butyl peroxide and 5 to 15% by weight of various hydrocarbon diluents. The mixtures were poured into smooth, 3-inch diameter, tin pans which had been given a light film of silicone oil or polythene to prevent sticking. The castings were ½ inch thick. The pans and contents were placed in an electric oven and heated according to the following schedule:

18 hours at 105° C.
24 hours at 115° C.
24 hours at 125° C.
24 hours at 135° C.
48 hours at 150° C.

The resulting resins were tested for moisture permeability (g./100 sq. in./mil/day) according to ASTM tentative procedure D988–48T with the following results:

| Hydrocarbon Diluent | Amt., Percent | Rock. Hard. 3% DTBP | Rock. Hard. 4% DTBP | MVP [6] |
|---|---|---|---|---|
| Paraffin wax (boiling 200° C. at 15 mm. Hg to 235° C. at 1.0 mm. Hg) | 10 | 57 | 80 | 2.6 |
| Paraffin wax (boiling 200° C. at 15 mm. Hg to 235° C. at 1.0 mm. Hg) | 15 | X | 84 | 2.3 |
| Lubricating oil [1] (boiling 200° to 350° C. at 10 mm. Hg) | 15 | | 56 | 2.7 |
| Phenol ext.[2] (boiling 200° to 350° C. at 10 mm. Hg) | 15 | | <0 | |
| White oil [3] (boiling 200° to above 350° C. at 10 mm. Hg) | 5 | | | 2.4 |
| White oil [3] (boiling 200° to above 350° C. at 10 mm. Hg) | 10 | 90 | 100 | [7] 2.2 |
| White oil [3] (boiling 200° to above 350° C. at 10 mm. Hg) | 15 | 80 | 99 | [7] 2.0 |
| Control | | 100 | 106 | [7] 3.2 |
| Polythene | | | | 1.1 |
| S-polymer [4] | | | | 1.0 |

[1] Oil containing approximately 20% aromatic compounds.
[2] Phenol extract of a mineral oil predominately aromatic.
[3] White mineral oil predominately paraffinic and naphthenic.
[4] Copolymer of styrene and isobutylene.
[5] Too soft to be measured.
[6] g. H₂O/100 in.²/24 hours/mil.
[7] An average of four values.

The above data show that the white oil which is predominately paraffinic and naphthenic is superior to the more aromatic oils and waxes in decreasing the moisture-vapor permeability. With respect to the effect on cure, white oils are the best; wax is intermediate and aromatic oils are the poorest. Thus it can be seen that the white oil and wax are suitable from these two standpoints; the white oil being preferred. If the Rockwell hardness is not critical for the intended application, then lubricating oils of low aromaticity may be suitable. The lubricating oil containing 20% aromatics reduces the cure to a greater extent than the white oil or wax.

While the above examples are limited to copolymers of butadiene and styrene, the paraffinic oils would decrease the moisture-vapor permeability of polybutadiene to the same extent and would give an even harder resin for the same curing schedule.

The nature of the present invention having been thus fully set forth and specific examples of the same given, what is claimed as new and useful and desired to be secured by Letters Patent is:

1. A process for preparing a solid infusible resin from a polymer chosen from the group consisting of homopolymers of butadiene-1,3 and copolymers of butadiene-1,3 with up to 50% styrene which comprises heating the polymer for three to five days at a temperature between 100 and 175° C. in the presence of 5 to 20% of a predominantly paraffinic and naphthenic hydrocarbon diluent boiling above 200° C. and 1.5 to 5% of ditertiary butyl peroxide.

2. Process according to claim 1 in which the polymer is polybutadiene prepared by polymerizing butadiene in the presence of an alkali metal catalyst.

3. Process according to claim 2 in which the catalyst is sodium.

4. Process according to claim 3 in which the hydrocarbon diluent is a white oil.

5. Process according to claim 1 in which the copolymer is an oily copolymer of 75 to 85% butadiene and 15 to 25% styrene prepared in the presence of an alkali metal catalyst.

6. Process according to claim 5 in which the catalyst is sodium.

7. Process according to claim 6 in which the hydrocarbon diluent is a white oil.

References Cited in the file of this patent

UNITED STATES PATENTS

| 2,440,299 | Rostler et al. | Apr. 27, 1948 |
| 2,648,644 | McMillan et al. | Aug. 11, 1953 |

OTHER REFERENCES

Taft et al.: Ind. and Eng. Chem., volume 45, No. 5, May 1953, pages 1043–1053.

Taft et al.: Rubber Age, volume 75, No. 1, April 1954, pages 61–64.